Patented Apr. 30, 1929.

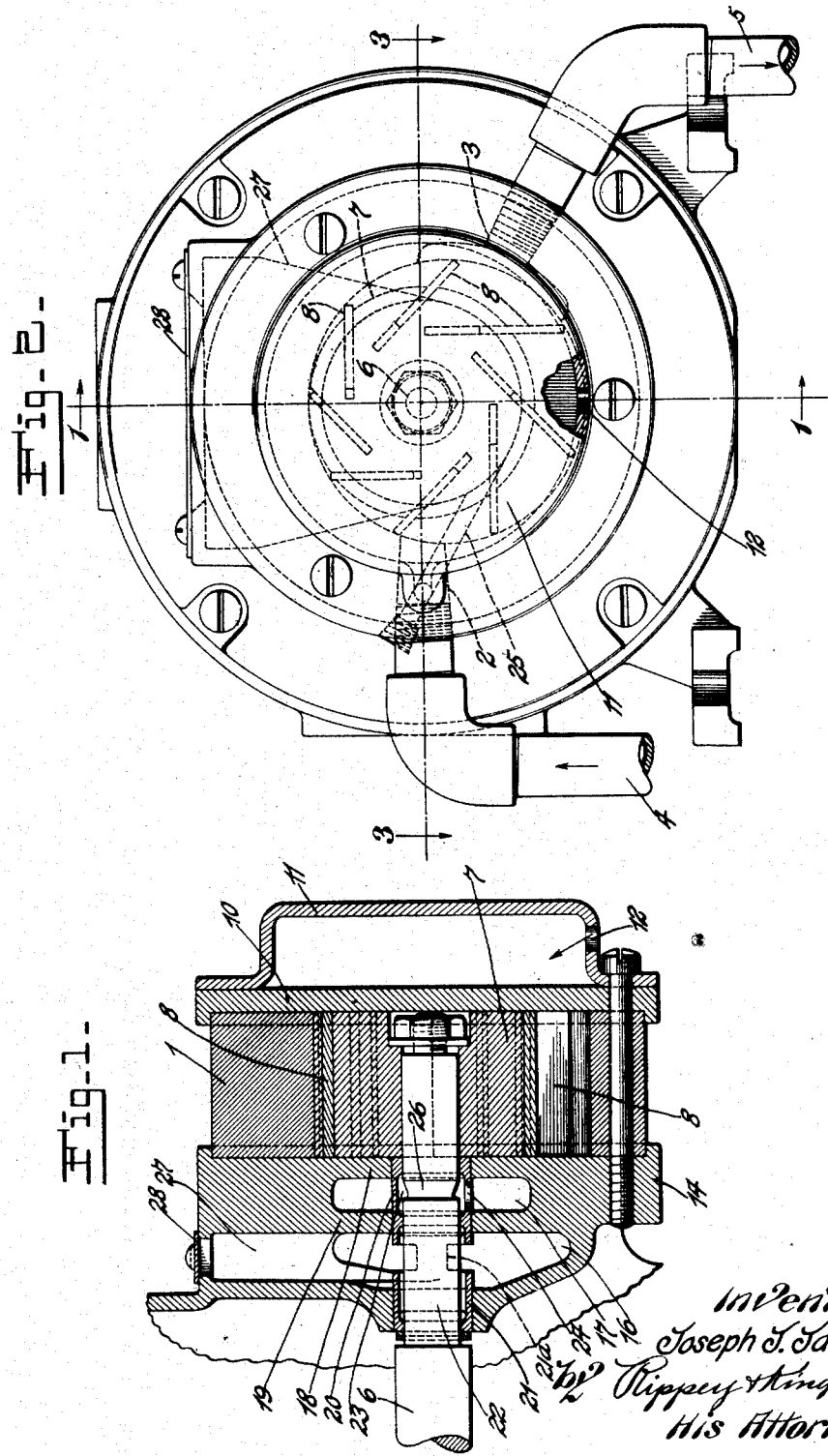

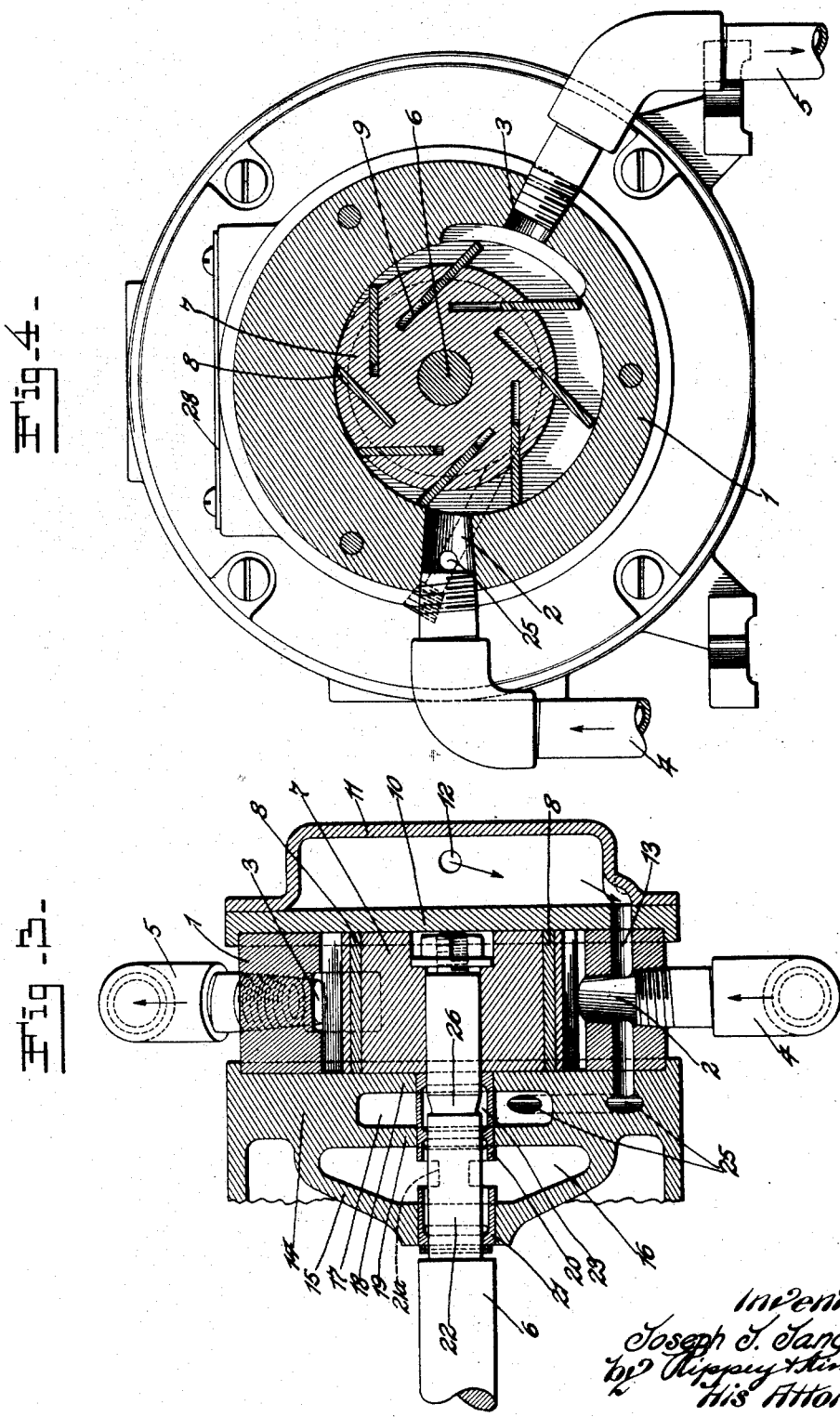

1,710,928

UNITED STATES PATENT OFFICE.

JOSEPH J. JANCA, OF ST. LOUIS, MISSOURI, ASSIGNOR TO THE EMERSON ELECTRIC MFG. CO., OF ST. LOUIS, MISSOURI, A CORPORATION OF MISSOURI.

BEARING.

Application filed August 16, 1926. Serial No. 129,400.

This invention relates to bearings, and an object is to provide a bearing for a rotary shaft constructed and designed to prevent leakage of oil or other liquid through the bearing.

Another object of the invention is to provide an improved bearing for an oil or other liquid pump of the rotor type, which bearing is constructed and arranged to trap the oil or other liquid leaking from the pump through a part of the bearing and to return the oil or other liquid from the trap to the pump.

Another object of the invention is to provide an improved bearing for an oil pump constructed and arranged to trap the oil leaking from the pump through a part of the bearing and, in addition, to provide means for maintaining the shaft in a lubricated condition and returning the trapped oil to the pump.

Other objects will appear from the following description, reference being made to the accompanying drawings, in which Fig. 1 is a vertical longitudinal sectional view, approximately on the line 1—1 of Fig. 2.

Fig. 2 is an end elevation of the pump with a part broken away.

Fig. 3 is a horizontal longitudinal section, approximately on the line 3—3 of Fig. 2.

Fig. 4 is a vertical cross sectional view.

The pump in which the present invention is shown embodied comprises a stator cylinder wall 1 having an inlet opening 2 and an outlet opening 3 with which the inlet pipe 4 and the outlet pipe 5 are respectively connected. The openings 2 and 3 are circumferentially spaced sufficiently so that operation of the pump will draw the oil or other liquid into the cylinder 1 through the inlet 2 and expel the oil or other liquid from the cylinder through the outlet opening 3.

A rotor shaft 6 extends into the cylinder 1 in eccentric relationship thereto and supports and operates in said cylinder the cylindrical rotor 7. The rotor 7 is mounted concentrically upon the shaft 6 and is, therefore, in eccentric relationship to the inner wall of the cylinder 1 (Fig. 4).

A series of piston blades 8 are mounted in slots 9 in the rotor and, during rotation of the rotor, are held in contact with the inner periphery of the cylinder 1 by centrifugal force, whereby the oil or other liquid is drawn into the cylinder through the inlet 2 and expelled from the cylinder through the outlet 3. It is impossible for the oil or other liquid to be carried entirely around the rotor, because one longitudinal portion of the periphery of the rotor (in this instance the upper longitudinal portion, Fig. 4) is in permanent contact with the adjacent wall of the cylinder 1.

One end of the cylinder is closed by an end plate 10 and supports an air chamber 11 having an inlet opening 12. From the chamber 11 a passage 13 opens through the end plate 10 and the body of the cylinder 1 into the inlet opening 2. The opposite end 14 of the cylinder contains the principal features of the present invention in association with the shaft 6. A wall 15 in connection with the cylinder end 14 forms a lubricant chamber 16 designed and arranged to contain a quantity of lubricant for adjacent bearings of the shaft 6. The end 14 is formed with a chamber 17 which, as hereinafter explained, receives oil leaking from the pump, and returns the oil to the pump to prevent loss and undesired leakage of oil from the machine. The chamber 17 is confined between the inner and outer walls 18 and 19, respectively, which, in the present instance, are integral portions of the cylinder end 14.

A cylindrical bearing bushing portion 20 extends across the receptacle or chamber 17 and is supported by both walls 18 and 19, forming therewith impervious joints. A cylindrical bearing bushing portion 21 is mounted in the wall 15, making impervious joint therewith, and is integrally united with the portion 20 by connections 21ª. A reduced portion 22 of the shaft 6 is rotatively journaled in the bushing bearing comprising the two portions 20 and 21 and extends into the cylinder 1 and is rigidly attached to the rotor 7, as previously explained. Around the reduced portion 22 of the shaft within the receptacle 17, the bushing bearing portion 20 forms an oil trap chamber 23 to receive and trap any oil working through the bearing around the shaft. The oil is prevented from passing further along the shaft by close contact of the bushing bearing portion 20 with the shaft and is discharged from the chamber 23 into the receptacle 17 through a hole 24 in the portion 20. From the receptacle 17 the oil is conveyed to the inlet opening 2 through an annular passage 25 formed in the end 14 and in the intervening portion of the cylinder 1 (Fig. 3).

To stop creeping of the oil along the shaft 22 within the chamber 23, said shaft is formed with a circumferential groove 26, the inner wall of which inclines toward the inner end of the bushing bearing portion 20 and the outer wall of which forms a sharp or abrupt shoulder, whereby movement of the oil along the shaft is stopped and the oil is thrown or caused to drop into the chamber 23, from which it is returned to the pump, as above described.

The end 14 contains an inlet passage 27 opening into the lubricant chamber 16 and is provided with a familiar closure device 28 (Fig. 1).

From the foregoing it will be seen that my present invention overcomes an existing objection and difficulty, arising out of the fact that it is desirable to prevent leakage and loss of oil from machines of this character. The present device comprises efficient means for trapping and returning the oil to the machine, and preventing its escape therefrom.

The invention is capable of useful embodiment in machines for various purposes, and the specific structure and relationship of parts may be modified as needed without departure from the nature and scope of the invention I do not restrict myself in any unessential particulars, but what I claim and desire to secure by Letters Patent is:—

1. The combination with a support, spaced walls forming a chamber in said support, and a rotary shaft extending through said walls and said chamber and provided with a circumferential groove in said chamber, of a unitary bearing bushing element in which said shaft is journaled, said bushing element extending across said chamber and being mounted in both of said walls and having a chamber of larger diameter than the shaft and enclosing said groove and having a discharge outlet from said bushing chamber to said first chamber.

2. The combination with a support, spaced walls forming a chamber in said support, and a rotary shaft extending through said support and said chamber and provided with a circumferential groove in said chamber, of a unitary bearing bushing element in which said shaft is journaled, said bushing element extending across said chamber and being mounted in both of said walls and having a chamber of larger diameter than the shaft and enclosing said groove and having a discharge outlet from said bushing chamber to said first chamber, a wall in connection with said support forming a lubricant containing chamber around said shaft, and an extension of said bushing across said lubricant containing chamber and having its end mounted in said last-named wall.

3. The combination with a support having walls forming a chamber therein, of a shaft extending through said walls and said chamber and having a circumferential groove in said chamber bounded on one side by an inclined wall and on the opposite side by an abrupt wall forming an approximately radial shoulder, and a unitary bearing bushing element extending across said chamber and mounted in and forming impervious joints with said walls and having a chamber therein around and of larger diameter than said shaft and enclosing said groove, said bushing element having an opening from said chamber therein to said chamber in said support.

4. In a machine of the character described, a cylinder having a liquid inlet passage and an air inlet passage opening into said liquid inlet passage, a shaft extending into said cylinder and provided with a circumferential shoulder outside of said cylinder, a bearing bushing through which said shaft extends having a chamber enclosing said shoulder and having an outlet from said chamber, and means for conducting liquid discharged from said bearing bushing to said liquid inlet opening.

5. In a machine of the character described, a cylinder having a liquid inlet passage and an air inlet passage opening into said liquid inlet passage, a shaft extending into said cylinder and provided with a circumferential shoulder outside of said cylinder, a bearing bushing through which said shaft extends having a chamber enclosing said shoulder and having an outlet from said chamber, means forming a liquid receiving chamber arranged to receive liquid from said outlet passage, and means for conducting liquid from said liquid receiving chamber to said liquid inlet passage to said cylinder.

JOSEPH J. JANCA.